No. 746,653. PATENTED DEC. 15, 1903.
T. ADAIR.
MACHINE FOR PREPARING SOIL FOR SEEDING.
APPLICATION FILED AUG. 3, 1901.
NO MODEL. 2 SHEETS—SHEET 1.

Witnesses
Inventor
Thomas Adair
Attorneys

No. 746,653. PATENTED DEC. 15, 1903.
T. ADAIR.
MACHINE FOR PREPARING SOIL FOR SEEDING.
APPLICATION FILED AUG. 3, 1901.
NO MODEL. 2 SHEETS—SHEET 2.

Inventor
Thomas Adair

Witnesses

No. 746,653. Patented December 15, 1903.

UNITED STATES PATENT OFFICE.

THOMAS ADAIR, OF BELFAST, IRELAND.

MACHINE FOR PREPARING SOIL FOR SEEDING.

SPECIFICATION forming part of Letters Patent No. 746,653, dated December 15, 1903.

Application filed August 3, 1901. Serial No. 70,839. (No model.)

*To all whom it may concern:*

Be it known that I, THOMAS ADAIR, a subject of the King of Great Britain and Ireland, residing at Belfast, in the county of Antrim and Province of Ulster, Ireland, have invented certain new and useful Improvements in Machines for Preparing Soil for Seeding, (for which I have applied for Letters Patent of Great Britain and Ireland, dated January 3, 1901, and numbered 167,) of which the following is a specification.

The object of the invention is to provide a simple and efficient machine for leveling the surface soil, breaking the clods thereof, and removing stones and weeds therefrom.

The invention will be fully described hereinafter, reference being had to the accompanying drawings, in which—

Figure 1:
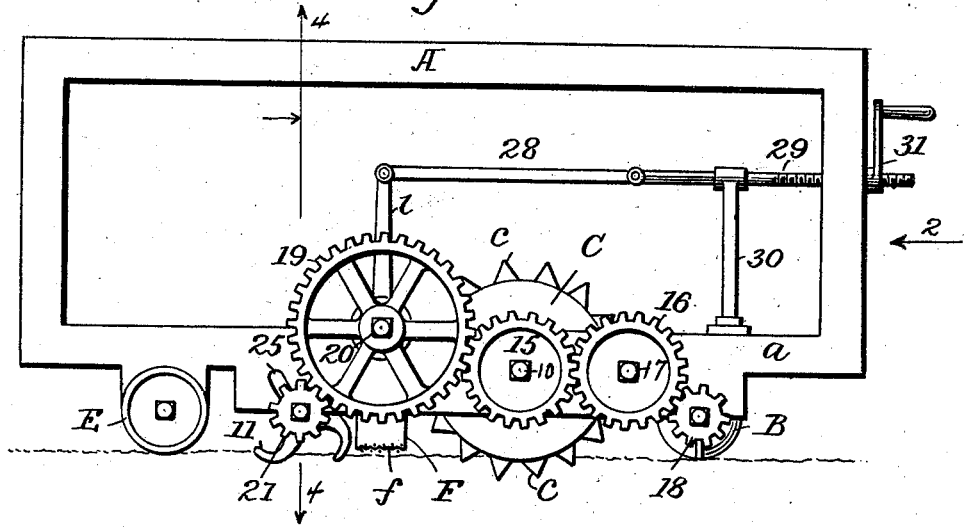
Figure 2:
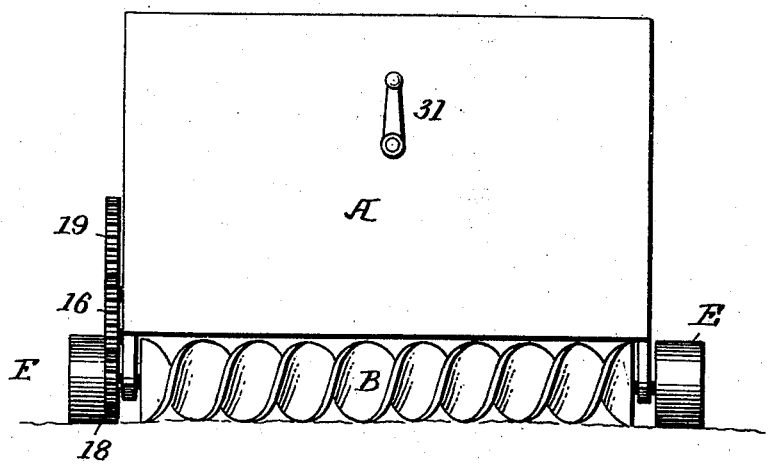
Figure 3:
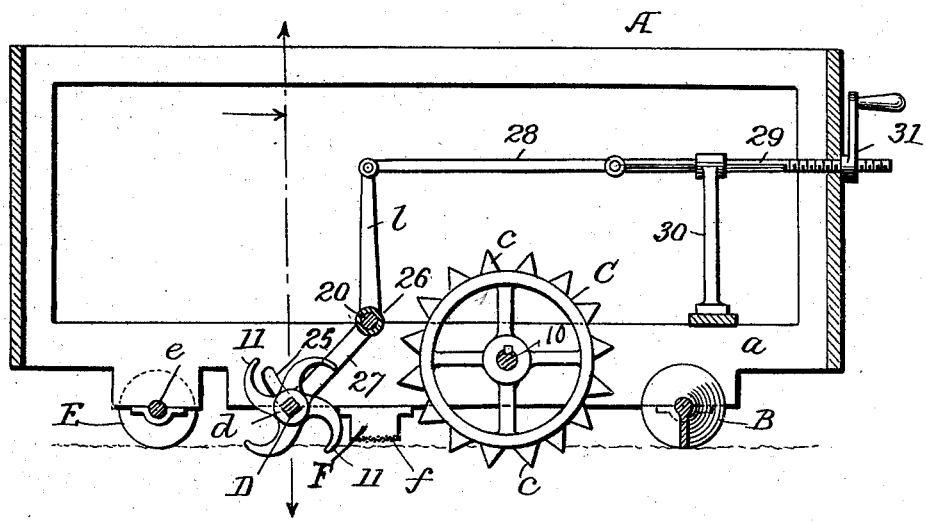
Figure 4:
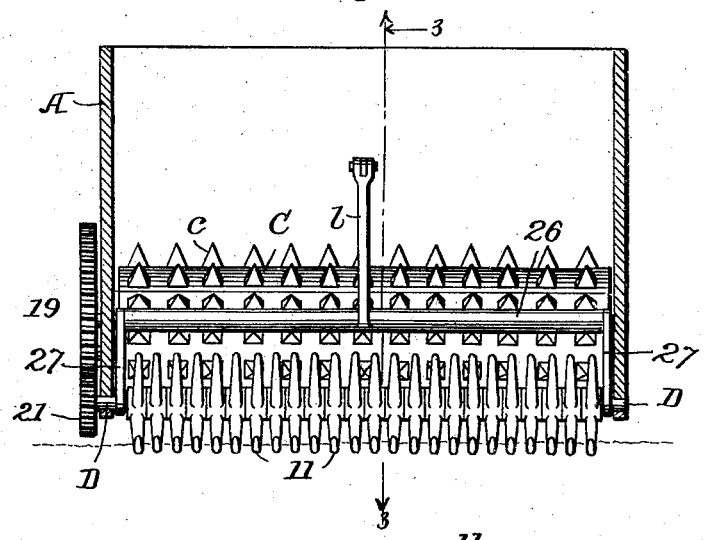
Figure 5:
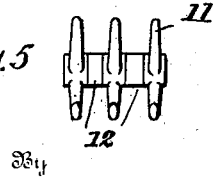

Figure 1 is a side elevation of a machine embodying my invention. Fig. 2 is an end elevation, partly broken away. Fig. 3 is a vertical longitudinal section on the line 3 3 of Fig. 4; Fig. 4, a vertical transverse section on the line 4 4 of Fig. 1. Fig. 5 is a detail showing a modification.

The frame of the machine is indicated by A and will preferably be of skeleton form.

Near the front end of the frame a horizontally-disposed Archimedean screw B extends transversely across it and is journaled in suitable bearings in side plates $a$, forming part of the frame A. To the rear of the Archimedean screw is a roller C, provided with a series of circumferential rows of short tapering spikes $c$, the function of which is to break up clods and raise stones and weeds to the surface. The axle 10 of the roller is journaled in suitable bearings on the frame and for convenience in turning the roller is made in two sections, one of which is fast with the axle and turns with it, while the other turns on the axle. The roller C partly supports the machine and forms the driving means for the other working parts.

To the rear of the roller C is a rotary harrow, consisting of a series of disks $d$, mounted upon a shaft D and provided with curved fingers 11. The disks $d$ will be mounted on the shaft to turn with it, but easily removable therefrom. Preferably the shaft will be angular in cross-section and the disks be provided with openings of corresponding shape. Spacing rings or washers 12 may be placed between the disks, as shown in Fig. 5, or the disks may project on one or both sides beyond the plane of the fingers, as shown in Fig. 4, so that the fingers on one disk will be spaced from those on adjacent disks. Evidently the space between the fingers on one disk and those on the next may be regulated as desired by varying the thickness of the spacing-washers.

It is of course understood that the portions of the shaft D within its bearings will be cylindrical, and, if preferred, the shaft may be cylindrical throughout its length and the disks be connected to it by a slot and key.

To the rear of the rotary harrow are supporting-wheels E, mounted on an axle $e$, supported in the frame.

Some means must be provided for driving the Archimedean screw and the rotary harrow, and in the present case a system of gearing is employed to transmit movement from the spiked roller to the screw and harrow. The axle of the spiked roller projects beyond its bearings at one end and is provided with a gear-wheel 15, which meshes with another similar wheel 16 on an axle 17, and the gear-wheel 16 meshes with a smaller gear 18 on the axle of the Archimedean screw B. The gear 15 also meshes with a larger gear 19 on an axle 20, and the gear 19 meshes with a small gear 21 on the end of the shaft of the rotary harrow. Preferably the gears 16, 18, 19, and 21 will be duplicated on opposite sides of the machine.

Between the rotary harrow and the spiked roller a receptacle F is supported in position to receive stones, weeds, &c., which may be lifted out of the soil by the rotary harrow. This receptacle will preferably be provided with a bottom of wire-netting $f$ in order that the fine soil may sift through.

It is necessary to provide some means for adjusting the position of the harrow relatively to the soil in order that the depth of penetration of the fingers into the soil may be varied to suit existing conditions and also that the fingers may be lifted entirely above the surface of the ground when the machine is turning or being moved without having to perform its work. This may be accomplished in various ways, and in the present case shaft D of the harrow is supported in curved slots 25 in the plates a. A sleeve 26 is mounted on the axle 20 to turn freely thereon, and arms 27 extend from the ends of the sleeve and are provided with eyes, through which the shaft D extends. A lever l, rigidly connected to the sleeve 26, extends upwardly, and its upper end is connected to one end of a link 28, the other end of the link being connected to one end of a bar 29, supported to slide lengthwise in a bracket 30 at the front end of the frame. The bar is screw-threaded, and a hand-nut 31 is fitted on the threaded portion and engages the frame. By turning the hand-nut in one direction the rod 29 and link 30 will move toward the front of the machine, and thereby operate the lever l to lift the rotary harrow, and it is evident that the extent of such lifting may be varied as desired. When the nut is turned in the opposite direction, the harrow will move downwardly under the influence of its own weight.

In operation the Archimedean screw will level the surface of the soil and the spiked roller will crush the clods and loosen stones, weeds, &c., and the rotary harrow will loosen up the soil to a considerable depth and lift the weeds and stones therefrom and deposit them in the receptacle F. Soil prepared in this manner will be in a pulverized condition suitable for sowing with any of the small seeds—such as flax, hemp, turnip—and the small cereals, which are usually sown in drills.

Without limiting myself to the precise details illustrated and described, I claim—

1. In a machine for preparing soil for seeding, the combination of a roller, a rotary harrow supported in rear of the roller, a receptacle supported between the roller and harrow to receive stones or weeds lifted by the harrow, and means for rotating the harrow, substantially as set forth.

2. In a machine for preparing soil for seeding, the combination of a horizontally-disposed Archimedean screw for leveling the surface of the soil, a roller in rear of the screw provided with circumferential rows of short tapering spikes for crushing clods, and a rotary harrow in rear of the roller provided with curved fingers for lifting stones and weeds out of the soil, substantially as set forth.

3. In a machine for preparing soil for seeding, the combination of a horizontally-disposed Archimedean screw, a roller supported in rear of the screw, a rotary harrow supported in rear of the roller, a receptacle supported between the harrow and roller for receiving stones and weeds lifted by the harrow, and means for transmitting rotary movement from the roller to the screw and the harrow, substantially as set forth.

In testimony whereof I have signed my name to this specification in the presence of two subscribing witnesses.

THOMAS ADAIR.

Witnesses:
HUGH HYNDMAN,
MALCOLM T. BRICE.